United States Patent
Al-Huwaider et al.

(10) Patent No.: US 12,049,807 B2
(45) Date of Patent: Jul. 30, 2024

(54) REMOVING WELLBORE WATER

(71) Applicant: Saudi Arabian Oil Company, Dhahran (SA)

(72) Inventors: Mustafa A. Al-Huwaider, Dhahran (SA); Shouxiang Mark Ma, Dhahran (SA); Mamdouh N. Al-Nasser, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 28 days.

(21) Appl. No.: 17/540,872

(22) Filed: Dec. 2, 2021

(65) Prior Publication Data

US 2023/0175364 A1   Jun. 8, 2023

(51) Int. Cl.
*E21B 43/12* (2006.01)
*E21B 47/04* (2012.01)

(52) U.S. Cl.
CPC .............. *E21B 43/13* (2020.05); *E21B 47/04* (2013.01)

(58) Field of Classification Search
CPC ...... E21B 43/13; E21B 43/121; E21B 43/122; E21B 43/123; E21B 43/124; E21B 43/126; E21B 43/127; E21B 43/128; E21B 43/129; E21B 47/04; E21B 21/013
See application file for complete search history.

(56) References Cited

U.S. PATENT DOCUMENTS

| | | | |
|---|---|---|---|
| 2,372,875 A | 4/1945 | Roy | |
| 2,852,230 A | 9/1958 | Garrison | |
| 3,150,727 A | 9/1964 | Garrison | |
| 3,164,206 A * | 1/1965 | Sharp | E21B 43/121 166/309 |
| 3,353,612 A | 11/1967 | Bannister | |

(Continued)

FOREIGN PATENT DOCUMENTS

| | | |
|---|---|---|
| CA | 2802988 | 10/2015 |
| CA | 2899222 | 1/2017 |

(Continued)

OTHER PUBLICATIONS

U.S. Appl. No. 16/863,740, filed Apr. 30, 2020, Al-Huwaider.

(Continued)

*Primary Examiner* — Nicole Coy
*Assistant Examiner* — Nicholas D Wlodarski
(74) *Attorney, Agent, or Firm* — Fish & Richardson P.C.

(57) ABSTRACT

A method of removing wellbore water from a production wellbore includes determining a production flow rate. The method also includes determining a target production flow rate of the production fluid and comparing the production flow rate to a flow rate threshold associated with the target production flow rate. The method also includes determining, based on a result of comparing the production flow rate to the flow rate threshold, that the production flow rate satisfies the threshold. The method also includes activating a fluid moving device fluidly coupled to a wellbore string extending from a terranean surface to the water to inject, into the water, at least one of i) a surfactant, ii) a gas, or iii) a foaming agent, allowing the water and the production fluid to emulsify together and thereby allowing a mixture of water and production fluid to flow to the terranean surface of the wellbore.

16 Claims, 6 Drawing Sheets

(56) References Cited

U.S. PATENT DOCUMENTS

| | | | |
|---|---|---|---|
| 3,371,520 A | 3/1968 | Slone et al. | |
| 3,807,227 A | 4/1974 | Smith, Jr. | |
| 3,882,714 A | 5/1975 | Libal et al. | |
| 3,903,974 A | 9/1975 | Cullen | |
| 3,981,187 A | 9/1976 | Howell | |
| 4,170,129 A | 10/1979 | Lowell | |
| 4,203,317 A | 5/1980 | Gupta | |
| 4,237,977 A * | 12/1980 | Lutener | E21B 37/00 |
| | | | 516/17 |
| 4,754,839 A | 7/1988 | Rathman | |
| 4,899,112 A | 2/1990 | Clark et al. | |
| 4,929,113 A | 5/1990 | Sheau | |
| 5,497,321 A | 3/1996 | Ramakrishnan et al. | |
| 5,531,112 A | 7/1996 | Young et al. | |
| 5,667,025 A | 9/1997 | Haessly | |
| 5,746,279 A | 5/1998 | Havlinek | |
| 6,028,307 A | 2/2000 | Young et al. | |
| 6,061,634 A | 5/2000 | Belani et al. | |
| 6,188,222 B1 | 2/2001 | Seydoux et al. | |
| 6,298,711 B1 | 10/2001 | Volfkovich et al. | |
| 6,301,959 B1 | 10/2001 | Hrametz et al. | |
| 6,516,275 B2 | 2/2003 | Lazaratos | |
| 6,549,879 B1 | 4/2003 | Cullick et al. | |
| 6,655,462 B1 | 12/2003 | Carmichael et al. | |
| 6,745,835 B2 | 6/2004 | Fields | |
| 6,931,324 B2 | 8/2005 | Taner et al. | |
| 7,086,484 B2 | 8/2006 | Smith, Jr. | |
| 7,088,639 B2 | 8/2006 | Wells et al. | |
| 7,376,517 B2 | 5/2008 | Rickett | |
| 7,555,389 B2 | 6/2009 | Cavalca et al. | |
| 7,607,478 B2 | 10/2009 | Martinez et al. | |
| 7,644,610 B2 | 1/2010 | Meister | |
| 7,703,317 B2 | 4/2010 | Goodwin et al. | |
| 7,753,125 B1 | 7/2010 | Penisson | |
| 7,789,170 B2 | 9/2010 | Church | |
| 8,109,140 B2 | 2/2012 | Tustin et al. | |
| 8,265,874 B2 | 9/2012 | Ma et al. | |
| 8,408,307 B2 | 4/2013 | Telfer | |
| 8,496,054 B2 | 7/2013 | Zazovsky et al. | |
| 8,550,184 B2 | 10/2013 | Buchanan et al. | |
| 8,593,140 B2 | 11/2013 | Saldungaray et al. | |
| 8,631,877 B2 | 1/2014 | Gewily | |
| 8,904,857 B2 | 12/2014 | Tustin et al. | |
| 8,955,584 B2 | 2/2015 | Telfer | |
| 8,978,481 B2 | 3/2015 | Powell et al. | |
| 9,031,820 B2 | 5/2015 | Frederick | |
| 9,109,417 B2 | 8/2015 | Leiper et al. | |
| 9,303,509 B2 | 4/2016 | Milkovisch et al. | |
| 9,383,476 B2 | 7/2016 | Trehan et al. | |
| 9,442,211 B2 | 9/2016 | Seydoux et al. | |
| 9,506,325 B2 | 11/2016 | Fould et al. | |
| 9,752,433 B2 | 9/2017 | Proett et al. | |
| 10,208,582 B2 | 2/2019 | Ma et al. | |
| 10,247,849 B2 | 4/2019 | Pfutzner et al. | |
| 10,316,648 B2 | 6/2019 | Swett | |
| 10,526,871 B2 | 1/2020 | Tzallas et al. | |
| 10,545,129 B2 | 1/2020 | Nguyen et al. | |
| 10,563,483 B2 | 2/2020 | Steele | |
| 10,590,741 B2 | 3/2020 | Van Der Veen | |
| 10,626,721 B2 | 4/2020 | Gisolf et al. | |
| 11,015,447 B2 | 5/2021 | Zainalabedin et al. | |
| 2002/0005286 A1 | 1/2002 | Mazorow et al. | |
| 2004/0016549 A1* | 1/2004 | Selinger | E21B 43/12 |
| | | | 166/305.1 |
| 2004/0200615 A1* | 10/2004 | Wilde | E21B 43/122 |
| | | | 166/250.15 |
| 2006/0000606 A1 | 1/2006 | Fields et al. | |
| 2006/0081398 A1 | 4/2006 | Arian | |
| 2007/0261855 A1 | 11/2007 | Brunet et al. | |
| 2008/0066536 A1 | 3/2008 | Goodwin et al. | |
| 2008/0121391 A1* | 5/2008 | Durham | E21B 43/121 |
| | | | 166/250.15 |
| 2008/0185142 A1 | 8/2008 | Pelletier | |
| 2008/0210420 A1 | 9/2008 | Ramakrishnan et al. | |
| 2009/0008079 A1 | 1/2009 | Zazovsky et al. | |
| 2009/0159278 A1 | 6/2009 | Corre et al. | |
| 2009/0326826 A1 | 12/2009 | Hull et al. | |
| 2010/0097886 A1 | 4/2010 | Day et al. | |
| 2010/0126717 A1 | 5/2010 | Kuchuk et al. | |
| 2011/0272150 A1 | 11/2011 | Ives et al. | |
| 2011/0315384 A1* | 12/2011 | Miquilena | C09K 8/80 |
| | | | 166/305.1 |
| 2012/0312530 A1 | 12/2012 | Pope et al. | |
| 2013/0020128 A1 | 1/2013 | Calleri | |
| 2013/0037270 A1 | 2/2013 | DiFoggio | |
| 2013/0081879 A1 | 4/2013 | Ward et al. | |
| 2013/0175036 A1 | 7/2013 | Hausot | |
| 2014/0131033 A1 | 5/2014 | Galvan-Sanchez | |
| 2014/0170025 A1 | 6/2014 | Weiner et al. | |
| 2015/0168573 A1 | 6/2015 | Zhang et al. | |
| 2015/0337636 A1* | 11/2015 | Gonzales | E21B 43/121 |
| | | | 700/282 |
| 2016/0091623 A1 | 3/2016 | Yu et al. | |
| 2016/0178772 A1 | 6/2016 | Carter | |
| 2016/0273292 A1 | 9/2016 | Morgan | |
| 2016/0326866 A1 | 11/2016 | Swett | |
| 2017/0051607 A1 | 2/2017 | Whittaker | |
| 2017/0321547 A1 | 11/2017 | Enkababian et al. | |
| 2018/0163522 A1* | 6/2018 | Simpson | E21B 47/07 |
| 2019/0129056 A1 | 5/2019 | Rasmus et al. | |
| 2019/0277806 A1 | 9/2019 | Huang | |
| 2020/0003599 A1 | 1/2020 | Theuveny et al. | |
| 2020/0088020 A1 | 3/2020 | Batarseh et al. | |
| 2021/0224682 A1 | 7/2021 | Al-Nasser | |
| 2021/0225070 A1 | 7/2021 | Al-Nasser | |
| 2021/0340859 A1 | 11/2021 | Al-Huwaider | |
| 2021/0381372 A1 | 12/2021 | Benlakhdar | |

FOREIGN PATENT DOCUMENTS

| | | |
|---|---|---|
| CN | 102619484 | 8/2012 |
| EP | 0514657 | 4/1992 |
| WO | WO 2008150825 | 12/2008 |
| WO | WO 2013044300 | 4/2013 |
| WO | WO 2014012781 | 1/2014 |
| WO | WO 2014168617 | 10/2014 |
| WO | WO 2018045255 | 3/2018 |
| WO | WO 2018111103 | 6/2018 |
| WO | WO 2019099038 | 5/2019 |

OTHER PUBLICATIONS

"IsoRite Isolated Multilateral Completion Systems: For Multilateral Wells that Require Re-Entry Capability to Access the Lateral," Halliburton, Completion Solutions, Multilateral Systems, 2018, 3 pages.

"Multiple Array Production Suite (MAPS)," Proactive Diagnostic Services, Well Integrity Diagnostic Specialists, Brochure, 2 pages.

"SLIC: Selective Lateral Intervention Completion System," Schlumberger, 2019, 2 pages.

Abdel-Basset et al., "Chemical and Mechanical Water Shut-Off in Horizontal Passive ICD Wells; Experience and Lessons Learnt in Giant Darcy Reservoir," IPTC-20210-MS, International Petroleum Technology Conference (IPTC), presented at the International Petroleum Technology Conference, Dhahran, Saudi Arabia, Jan. 13-15, 2020, 29 pages.

Abernethy, "Production increase of heavy oils by electromagnetic heating," Journal of Canadian Petroleum Technology, Jul.-Sep. 1976, 8 pages.

Abubaker et al., "Technology Trial Review: Selective Coiled Tubing Re-Entry of Two Open Hole Multilateral Wells Using Intelligent Electromechanical Arm," SPE-182996-MS, Society of Petroleum Engineers (SPE), presented at the Abu Dhabi International Petroleum Exhibition & Conference, Abu Dhabi, UAE, Nov. 7-10, 2016, 14 pages.

Akinlolu, "Capillary Pressure Determination Using the Micropore Membrane Technique," A Thesis Submitted to the Graduate Faculty of Texas Tech University in Partial Fulfillment of the Requirements for the Degree of Master of Science in Petroleum Engineering, May 2012.

(56) References Cited

OTHER PUBLICATIONS

Al-Bulushi et al., "Capillary Pressure Corrections, Quality Control and Curve Fitting Workflow," IPTC-19514-MS, International Petroleum Technology Conference, 2019, 25 pages.
Al-Khaldy et al., "First-Ever Level 4 Multilateral Well in North Kuwait Successfully Completed, Improves Oil Production," SPE-171792-MS, Society of Petroleum Engineers (SPE), presented at the Abu Dhabi International Petroleum Exhibition and Conference, Abu Dhabi, UAE, Nov. 10-13, 2014, 12 pages.
Almansour and Al-Bassaz, "Physical and Chemical characterization and evaluation of organic matter from tar-mat samples: Case Study of Kuwaiti Carbonate Reservoir," Journal of Chemical Technology App 1:1, Sep. 2017, 12 pages.
Alomair et al., "Viscosity Prediction of Kuwaiti Heavy Crudes at Elevated Temperatures," SPE 150503, Society of Petroleum Engineers (SPE), presented at the SPE Heavy Oil Conference and Exhibition, Kuwait, Dec. 12-14, 2011, 18 pages.
aqua-calc.com [online], "vol. of liquid ammonia," available on or before Nov. 1, 2014 via Internet Archive, Wayback Machine URL <https://web.archive.org/web/20141101074746/https://www.aqua-calc.com/calculate/weight-to-volume/substance/liquid-blank-ammonia>, retrieved on Sep. 17, 2021, retrieved from URL <https://www.aqua-calc.com/calculate/weight-to-volume/substance/liquid-blank-ammonia>, 3 pages.
araner.com [online], "What makes combined cycle power plants so efficient," 2021, retrieved on Sep. 17, 2021, retrieved from URL <https://www.araner.com/blog/combined-cycle-power-plants>, 10 pages.
Arukhe et al., "Technology Evolution in a Giant Saudi Aramco's Field Development," WPC-21-0182, Work Petroleum Congress (WPC), presented at the 21st World Petroleum Congress, Moscow, Russia, Jun. 2014, 17 pages.
bakerhughes.com [online] "VACS G2 system," Baker Hughes, available on or before Oct. 5, 2020, retrieved on Jan. 7, 2021, retrieved from URL <https://www.bakerhughes.com/wellbore-cleanup/vacs-g2-system>, 5 pages.
bakerhughes.com [online] "Vectored annular cleaning system (VACS) technology," available on or before Oct. 5, 2020, retrieved on Jan. 7, 2021, retrieved from URL https://www.bakerhughes.com/wellbore-cleanup/vectored-annular-cleaning-system-vacs-technology, 4 pages.
Bauldauff et al., "Profiling and quantifying complex multiphase flow," Oilfield Review, Autumn 2004, 10 pages.
Benlakhdar et al., "Integrating pulse neutron measurements with array production logging for enhanced production characterization in horizontal wells," SPE 192219-MS, presented at the SPE Kingdom of Arabia Annual Technical Symposium and Exhibition, Dammam, Saudi Arabia, Apr. 2018, 11 pages.
Bermudez et al., "Assisted Extra Heavy Oil Sampling by Electromagnetic Heating," SPE 171073-MS, Society of Petroleum Engineers (SPE), presented at the SPE Heavy and Extra Heavy Oil Conference—Latin American, Colombia, Sep. 24-26, 2014, 13 pages.
Bhushan et al., "Advanced Logging Applications for Brownfield Optimization," Presented at the International Petroleum Technology Conference held in Dubai, U.A.E., Dec. 4-6, 2007, 7 pages.
Bockmiller et al., "University of California strategies for decarbonization: Replacing Natural Gas TomKat Natural Gas Exit Strategies Working Group Report to the TomKat Foundation," University of California, Feb. 2018, 101 pages.
Bristow et al., "Comparison Of Single And Dual Probes For Measuring Soil Thermal Properties With Transient Heating," Soil Research, 1994, 32 (3): 447.
Bristow et al., "Measurement of Soil Thermal Properties with a Dual-Probe Heat-Pulse Technique," Soil Sci. Soc. Am. J. 58:1288-1294, Sep. 1994, 7 pages.
Chace et al., "Applications of a new multiple sensor production logging system for horizontal and highly-deviated multiphase producers," SPE 63141, presented at the 2000 SPE Annual Technical Symposium and Exhibition, Dallas, Texas, Oct. 2000, 14 pages.
Ciesche, "Mercury Porosimetry," Handbook of Porous Solids, 2002, 43 pages.

Collodi et al., "Hydrogen Production via Steam Reforming with CO2 Capture," Chemical Engineering Transactions, Apr. 2010, 19:37-42, 6 pages.
Ertekin et al., "Artificial Intelligence Applications in Reservoir Engineering: A Status Check," Energies, Jul. 2019, XP055776157, 12(15): 2897, 22 pages.
Eyvazzadeh et al., "An Innovative Application to Reduce Petrophysical Uncertainty in Reservoir Monitoring: Case Studies from Giant Saudi Arabian Fields," SPE 97519, Society of Petroleum Engineers (SPE), SPE International Improved Oil Recovery Conference in Asia Pacific, Dec. 5-6, 2005.
glossary.oilfield.slb.com [online], "Distributed temperature log," retrieved from URL <https://www.glossary.oilfield.slb.com/en/Terms/d/distributed_temperature_log.aspx>, retrieved on Feb. 12, 2020, available on or before 2020, 1 page.
Halliburton [online], "Digital Twin Implementation for Integrated Production & Reservoir Management," iEnergy, 2018, retrieved on Sep. 27, 2019, retrieved from URL: <https://www.ienergy.community/Portals/1/IenergyDocs/Marketing/DigitalTwin_Integrated_Reservoir_Production.pdf>, 17 pages.
halliburton.com, [online], "Core Vault System," available on or before 2020, retrieved on Nov. 9, 2020, retrieved from URL <https://www.halliburton.com/en-us/ps/wireline-perforating/wireline-and-perforating/open-hole-logging/sidewall-coring/corevault.html>, 2 pages.
horizontalwireline.com [online], "Multi-arm Caliper MAC 40," retrieved from URL <https://horizontalwireline.com/wp-content/uploads/2014/09/AHWS-Multi-Arm_Caliper.pdf>, retrieved on Feb. 12, 2020, available on or before 2014, 2 pages.
Huang, "Impact of rising natural gas prices on U.S. ammonia supply," A Report from the Economic Research Service, United States Department of Agriculture, Aug. 2007, 19 pages.
ipieca.org [online], "Open cycle gas turbines," Feb. 2014, retrieved on Sep. 17, 2021, retrieved from URL <https://www.ipieca.org/resources/energy-efficiency-solutions/power-and-heat-generation/open-cycle-gas-turbines/>, 12 pages.
JPT Staff, "Techbits: Enhancing Production in Russia's Oil and Gas Fields," SPE-0706-0024-JPT, J Pet Technol, 2006, 58(07): 24-25, 2 pages.
Kelder et al., "Expanding advanced production logging operations to short radius horizontal wells," SPE 93526, Society of Petroleum Engineers (SPE), presented at the 14th SPE Middle East Oil & Gas Show and Conference, Bahrain International Exhibition Centre, Bahrain, Mar. 12-15, 2005, 7 pages.
Kuchuk et al., "Horizontal Well Performance Evaluation Tools and Techniques," SPE 48853, Society of Petroleum Engineers, 1998, 16 pages.
Lenn, "Horizontal Well Performance Evaluation and Fluid Entry Mechanisms," SPE-49089-MS, Society of Petroleum Engineers, Sep. 1998, 13 pages.
Liu, "Acoustic Properties of Reservoir Fluids," A Dissertation Submitted to the Department of Geophysics and Committee on Graduate Studies of Stanford University in Partial Fulfillment of the Requirements for the Degree of Doctor of Philosophy, Jun. 1998, 111 pages.
Lu et al., "An Improved Model For Predicting Soil Thermal Conductivity From Water Content At Room Temperature," Soil Science Society Of America Journal, 2007, 71: 8-14.
Ma et al., "Cased-hole reservoir saturation monitoring in mixed-salinity environments—A new integrated approach," SPE 92426, Society of Petroleum Engineers (SPE), presented at the 14th SPE Middle East Oil & Gas Show and Conference, Bahrain, Mar. 12-15, 2005, 10 pages.
Ma et al., "Dynamic petrophysics—applications of time-lapse reservoir monitoring in Saudi Arabia," SPE 95882, Society of Petroleum Engineers (SPE), presented at the 2005 SPE Annual Technical Conference and Exhibition, Dallas, Texas, Oct. 9-12, 2005, 8 pages.
Ma et al., "Resolving the mixed salinity challenges with a methodology developed from pulsed neutron capture gamma ray spectral measurements," SPE 170608, Society of Petroleum Engineers (SPE), presented at the SPE Annual Technical Conference and Exhibition, Amsterdam, The Netherlands, Oct. 27-29, 2014, 12 pages.

(56) References Cited

OTHER PUBLICATIONS

McCoy et al., "Analyzing Well Performance VI," Southwestern Petroleum Short Course Association, Lubbock, 1973, 9 pages.
metergroup.com [online], "Thermal Properties: Why the TEMPOS method outperforms other techniques," retrieved from URL <https://www.metergroup.com/environment/articles/thermal-properties-transient-methodoutperforms-techniques/>, retrieved on Feb. 12, 2020, available on or before 2020, 6 pages.
Mohaghegh, "Reservoir simulation and modeling based on artificial intelligence and data mining (AI&DM)," Journal of Natural Gas Science and Engineering, Aug. 2011, 3(6): 697-705, XP028125623, 9 pages.
Mohamed et al., "Leak Detection by Temperature and Noise Logging," Society of Petroleum Engineers, Abu Dhabi International Petroleum Conference and Exhibition, Nov. 11-14, 2012, Abu Dhabi, UAE, abstract retrieved from URL <https://archive.is/20130628032024/http://www.onepetro.org/mslib/servlet/onepetropreview#selection -191.0-191.96>, retrieved on Feb. 12, 2020, 2 pages, Abstract Only.
Moses, "Geothermal Gradients," Drilling & Production Practice, Core Lab. Inc., Dallas, Texas, 1961, 7 pages.
oilproduction.net [online], "Acoustic Velocity for Natural Gas," retrieved on Jan. 7, 2021, URL <http://oilproduction.net/files/Acoustic%20Velocity%20for%20Natural%20Gas.pdf>, 6 pages.
powerengineeringint.com [online], "Gas turbines breaking the 60% efficiency barrier," Power Engineering International, May 2010, retrieved on Sep. 21, 2021, retrieved from URL <https://www.powerengineeringint.com/coal-fired/equipment-coal-fired/gas-turbines-breaking/>, 6 pages.
Rajesh et al., "Thermal efficiency of combined cycle power plant," International Journal of Engineering and Management Research, Jun. 2018, 8(3):229-234, 7 pages.
Saeed et al., "Multilateral Reentry System for Well Surveillance: Design, Implementation and Summary of 40 Jobs Performed in Fields," SPE-199849-MS, Society of Petroleum Engineers (SPE), presented at the SPE/ICoTA Well Intervention Conference and Exhibition, The Woodlands, Texas, Mar. 24-25, 2020, 9 pages.
Saumya et al., "Saturation Forecast Using Machine Learning: Enabling Smarter Decision-Making Capabilities," SPE-197419-MS, Society of Petroleum Engineers, Nov. 2019, XP055796992, 10 pages.
Shagdar et al., "Process analysis of solar steam reforming of methane for producing low-carbon hydrogen," Royal Society of Chemistry, 2020, 10:12582, 16 pages.
slb.com [online] "Well Scavenger," Schlumberger, available on or before Aug. 3, 2020, via Internet Archive: Wayback Machine URL <http://web.archive.org/web/20200803130523/https://www.slb.com/completions/fluids-and-tools/wellbore-cleaning-tools/debris-recovery-tools/well-scavenger-vacuum-debris-removal-tool>, retrieved on Jan. 12, 2021, URL <https://www.slb.com/completions/fluids-and-tools/wellbore-cleaning-tools/debris-recovery-tools/well-scavenger-vacuum-debris-removal-tool>, 5 pages.
slb.com [online], "Discovery MLT, Multilateral reentry system," available on or before Feb. 24, 2021, retrieved from URL <https://www.slb.com/well-intervention/coiled-tubing-intervention/mechanical-intervention/discovery-mlt-multilateral-reentry-system>, 3 pages.
slb.com [online], "PS Platform, Production services platform," retrieved from URL <https://www.slb.com/-/media/files/production/product-sheet/ps_platform_ps.ashx>, retrieved on Feb. 12, 2020, available on or before 2014, 3 pages.
Sudakov et al., "Artificial Neural Network Surrogate Modeling of Oil Reservoir: A Case Study," Springer International Publishing, Cham, Advances in Neural Networks—ISNN 2019, Lecture Notes in Computer Science, Jun. 2019, 11555: 232-241.
Supple, "Units & Conversions Fact Sheet," Massachusetts Institute of Technology Energy Club, Apr. 2007, 2 pages.
Thomas et al., "Determination of Acoustic Velocities for Natural Gas," SPE 2579, Society of Petroleum Engineers (SPE), Journal of Petroleum Technology, Jul. 1970, 22(7):889-895.
Vaferi et al., "Hydrocarbon reservoir model detection from pressure transient data using coupled artificial neural network—Wavelet transform approach," Applied Soft Computing, Elsevier, Amsterdam, NL, Jun. 2016, XP029661645, 47: 63-75, 13 pages.
Wang et al., "Acoustic Velocities in Petroleum Oils," SPE 18163 MS/ SPE 18163 PA, Society of Petroleum Engineers (SPE), presented at the SPE Annual Technical Conference and Exhibition, Oct. 2-5, 1988, 15 pages.
web.mit.edu [online], "8.7 Combined cycles in stationary gas turbine for power production," available on or before May 11, 2021, via Internet Archive, Wayback Machine URL <https://web.archive.org/web/20120915000000*/http://web.mit.edu/16.unified/www/SPRING/thermodynamics/notes/node67.html>, retrieved on Sep. 16, 2021, retrieved from URL <http://web.mit.edu/16.unified/www/SPRING/thermodynamics/notes/node67.html>, 3 pages.
Webb, "An Introduction To The Physical Characterization of Materials by Mercury Intrusion Porosimetry with Emphasis On Reduction And Presentation of Experimental Data," Micromeritics Instrument Corp., Jan. 2001.
Welch et al., "Improving the flexibility and efficiency of gas turbine-based distributed power plants," Power Engineering, Sep. 2015, 14 pages.
Wesenberg, "Gas heated steam reformer modelling," Doctoral thesis for the degree of doktor ingeniør Trondheim, Norwegian University of Science and Technology, Apr. 2006, 210 pages.
wildcatoiltools.com [online] "Hydro Vortex," Wildcat Oil Tools, available on or before Oct. 5, 2020, retrieved on Jan. 12, 2021, retrieved from URL <https://www.wildcatoiltools.com/hydrovortex>, 5 pages.
Wilhelms and Larter, "Origin of tar mats in petroleum reservoirs Part II: Formation mechanisms for tar mats," Marine Petroleum Geology 11:4, Aug. 1994, 15 pages.
Xindi et al., "Comprehensive Review of Water Shutoff Methods for Horizontal Wells," Petroleum Exploration and Development, Dec. 2017, 44:6 (1022-1029), 8 pages.

* cited by examiner

REMOVING WELLBORE WATER

FIELD OF THE DISCLOSURE

This disclosure relates to production methods and equipment, and particularly to methods and tools to remove water, such as stagnant water, from a production wellbore.

BACKGROUND OF THE DISCLOSURE

Production wellbores are drilled in formations to extract hydrocarbons from the formations. Production tubing is often used inside production wellbores to flow the hydrocarbons from the formation to the surface. Wellbore fluids such as stagnant water can interfere with the production of hydrocarbons. Methods and equipment to improve the hydrocarbon production process are sought.

SUMMARY

Implementations of the present disclosure include a method that includes determining, by a processing device, a production flow rate of a production fluid in a wellbore, the wellbore including water at a downhole location of the wellbore. The method also includes determining, by the processing device, a target production flow rate of the production fluid. The method also includes comparing, by the processing device, the production flow rate to a flow rate threshold associated with the target production flow rate. The method also includes determining, based on a result of comparing the production flow rate to the flow rate threshold, that the production flow rate satisfies the threshold. The method also includes activating, by the processing device or an operator, a fluid moving device fluidly coupled to a wellbore string extending from a terranean surface to the water to inject, through the wellbore string and into the water, at least one of i) a surfactant, ii) a gas, or iii) a foaming agent, allowing the water and the production fluid to emulsify together and thereby allowing a mixture of water and production fluid to flow from the downhole location to the terranean surface of the wellbore.

In some implementations, the flow rate threshold includes between 60 and 80 percent of the target flow rate, and determining that the production flow rate satisfies the threshold includes determining that the production flow rate is equal to or less than the flow rate threshold.

In some implementations, the wellbore string is fluidly coupled to a perforated wellbore tool residing at a downhole end of the wellbore string, and the introducing includes injecting the at least one of i) the surfactant, ii) the gas, or iii) the foaming agent through apertures of the perforated wellbore tool into the water. In some implementations, flowing the water mixed with the production fluid to the surface includes flowing, through the apertures of the perforated wellbore tool into the wellbore tool, and from the perforated wellbore tool to the surface of the wellbore.

In some implementations, the wellbore string includes water sensors, and the method further includes detecting, with the water sensors, the location of the water. In some implementations, the method further includes logging, after the flowing, the wellbore with the water sensors to ensure all or most water in the wellbore has been removed.

Implementations of the present disclosure include a method that includes determining a production flow rate of a production fluid in a wellbore. The wellbore includes water at a downhole location of the wellbore. The method includes comparing the production flow rate to a flow rate threshold. The method also includes determining, based on a result of comparing the production flow rate to the flow rate threshold, that the production flow rate satisfies the threshold. The method also includes emulsifying, by flowing a fluid along a wellbore string disposed in the wellbore, the water to allow the water to mix with the production fluid. The method also includes flowing, through the wellbore string or a second wellbore string, the water mixed with the production fluid to a surface of the wellbore.

In some implementations, emulsifying the water includes introducing, through the wellbore string and based on the determination that the production flow rate satisfies the threshold, an emulsifier including at least one of i) a surfactant, ii) a gas, or iii) a foaming agent to the water.

In some implementations, the flow rate threshold is associated with a target production flow rate, the target flow rate based on a real or ideal well productivity of the wellbore. In some implementations, the flow rate threshold includes between 60 and 80 percent of the target flow rate, and determining that the production flow rate satisfies the threshold includes determining that the production flow rate is equal to or less than the flow rate threshold.

In some implementations, the method further includes determining, before comparing the production flow rate to the flow rate threshold, a target production flow rate, the target flow rate based on a real or ideal well productivity of the wellbore.

In some implementations, the method further includes, after determining the target production flow rate, determining, based on the target production flow rate, the flow rate threshold.

In some implementations, the wellbore string is fluidly coupled to a perforated wellbore tool residing at a downhole end of the wellbore string, and introducing the emulsifier to the water includes injecting the emulsifier flowing through apertures of the perforated wellbore tool into the water. In some implementations, flowing the water mixed with the production fluid to the surface includes flowing, through the apertures of the perforated wellbore tool into the wellbore tool, and from the perforated wellbore tool to the surface of the wellbore.

In some implementations, the wellbore string includes water sensors, and the method further includes, before introducing the emulsifier to the water, detecting, with the water sensors, the location of the water. In some implementations, the method further includes re-logging, after the flowing, the wellbore with the water sensors to ensure all or most water in the wellbore has been removed.

In some implementations, introducing the emulsifier includes introducing a water foaming agent and a gas including at least one of methane or carbon dioxide.

Implementations of the present disclosure also include a wellbore assembly that includes a wellbore string disposed within a wellbore and extending from a terranean surface of the wellbore to a downhole location of the wellbore including water. The wellbore assembly also includes a pump fluidly coupled to the wellbore string. The pump is configured to flow an emulsifier including at least one of i) a surfactant, ii) a gas, or iii) a foaming agent through the wellbore string from the terranean surface of the wellbore to the downhole location of the wellbore. The wellbore assembly also includes a wellbore tool attached and fluidly coupled to a downhole end of the wellbore string, the wellbore tool including a tubular body including apertures and configured to flow, from the wellbore string, the emulsifier. The wellbore tool is configured to inject the emulsifier into the water, emulsifying the water with the production fluid. The pump is configured to flow, from the wellbore tool to the wellbore string and to the terranean surface of the wellbore, the emulsified water and production fluid.

In some implementations, the wellbore tool includes a water sensor configured to detect the water in the wellbore to allow the wellbore tool to deliver the emulsifier to the water.

In some implementations, the wellbore tool includes a tubular body defining a plurality of apertures. The tubular body injects, through the apertures, the emulsifier flowing into the water.

DETAILED DESCRIPTION OF THE DISCLOSURE

The present disclosure relates to removing water from production wellbores to improve well productivity of oil and gas producers. Often, limited amounts of water may be left over from drilling and/or completing the well. Additionally, water produced from the formation can have low water fractional flow and thus interfere with hydrocarbon production. Even when the amount of water is limited and often small, the water tends to stubbornly remain in the wellbore (due to factors such as water density and wellbore trajectory), acting as a choke and interfering with the flow of hydrocarbons to the surface. The water can stay at the bottom of vertical wells or sumps in horizontal wells, or circulating in horizontal wells. For example, in non-vertical wellbores, the stagnant water across the wellbore not only reduces the cross-sectional area available for the production of formation fluids, but also creates an additional dragging force to the produced hydrocarbons that can cause significant pressure losses. Both factors can contribute to significant decrease in well productivity by a factor of, for example, 30% to 50%. The longer the horizontal well, the more severe the issue may become. The methodology of the present disclosure emulsifies and mixes all or most of the wellbore stagnant water with the oil to flow the water-oil mixture to the surface, thus removing the stagnant water from the wellbore.

Particular implementations of the subject matter described in this specification can be implemented so as to realize one or more of the following advantages. For example, removing the stagnant water from the wellbore can improve the productivity of production wellbores. Additionally, using an emulsifier can allow all of the water to be removed from the wellbore. With the stagnant water being removed, formation hydrocarbon producers can produce its normal potential, so that conventional reservoir management best practices can be applied, avoiding unnecessary well intervention operations.

Figure 1:
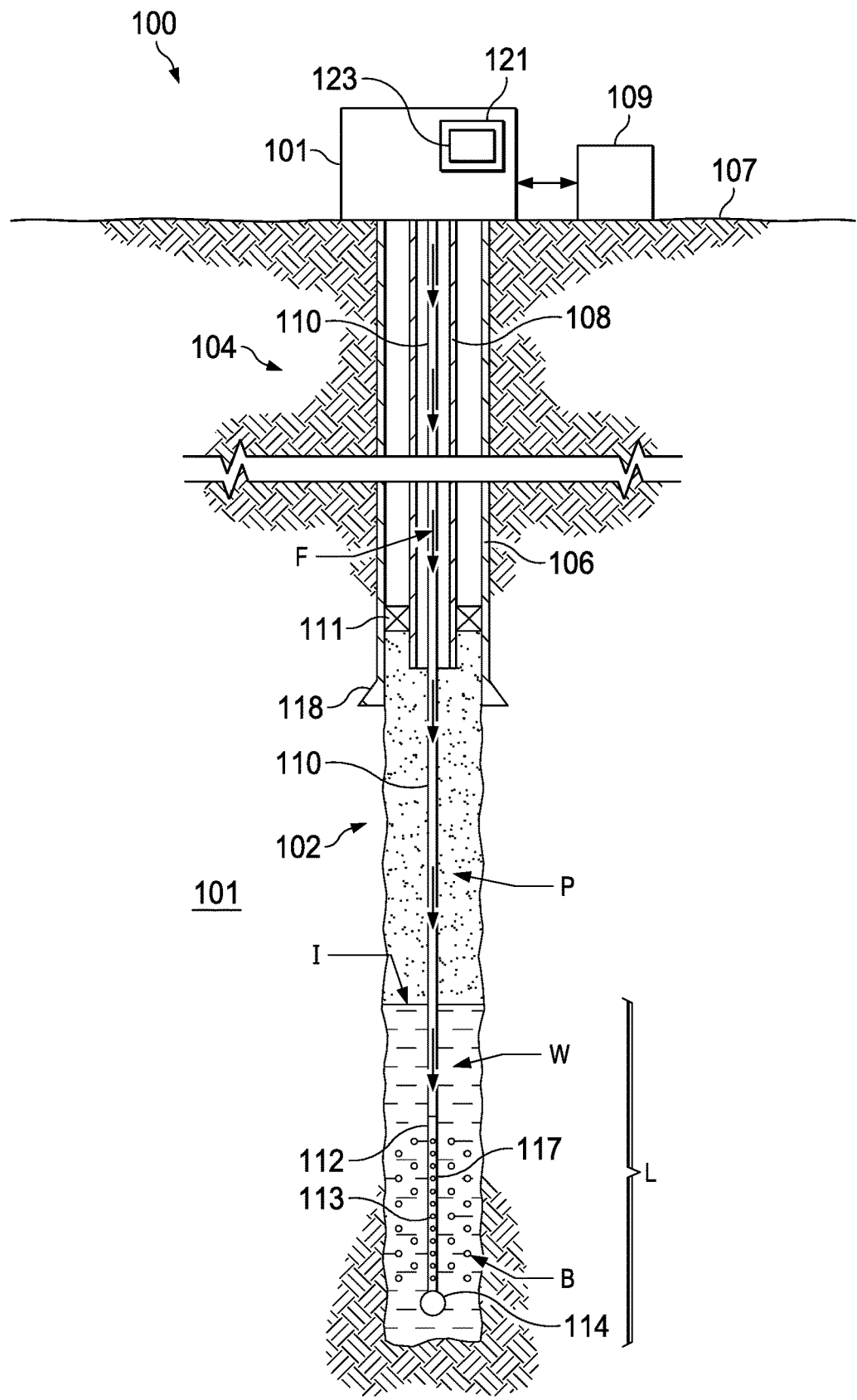
FIG. 1 is a front schematic view, partially cross sectional, of a wellbore assembly disposed in a vertical wellbore containing water.

FIG. 1 shows a wellbore assembly 100 that includes surface equipment 101, a production string 108 extending from the surface equipment and disposed in a wellbore 104, and a wellbore string 110. The production string 108 can include a completion assembly that includes a completion packer 111 and a casing shoe 118.

The wellbore 104 can be a production wellbore formed in a geologic formation 101. The geologic formation 101 can include a hydrocarbon reservoir from which a production fluid "P" (e.g., hydrocarbons) can be extracted. The wellbore 104 extends from a surface 107 (e.g., a terranean surface) to a downhole end of the wellbore 104. The wellbore 104 can be a vertical or non-vertical wellbore. The wellbore 104 can include a casing 106 and an open hole 102 that extends from the casing shoe 118 to the end of the wellbore 104. In some implementations, the wellbore 104 can be cased to the end of the wellbore 104. The wellbore 104 can contain undesirable fluids such as water "W" that interferes with the production of hydrocarbons. The water can be contained in one downhole location "L" or multiple locations of the wellbore 104.

The surface equipment 101 can include a rig or a rig-less assembly such as coiled tubing equipment. The surface equipment can also include a surface pump 109 that flows fluids to and from the wellbore 104. In some implementations, instead of or in addition to the surface pump 109, the production tubing 108 (or the wellbore tubing 110) can include an electric submersible pump (ESP) to flow fluid to and from the wellbore 104.

The wellbore string 110 can include, for example, coiled tubing or some other type of tubing. The wellbore string 110 is disposed inside the production tubing 108. The wellbore string 110 extends from the terranean surface 107 of the wellbore to the downhole zone or location "L" of the wellbore 104. The wellbore string 110 extends beyond the fluid outlet of the production tubing 108 into the open hole section 102 of the wellbore 104. The wellbore string 110 can include or be attached to a wellbore tool 112 to inject a fluid (e.g., an emulsifier) into the water "W."

The wellbore tool 112 can be attached (and fluidly coupled) to a downhole end of the wellbore string 110. The wellbore tool 112 can be a wellbore water removing tool (WWRT) that includes a perforated tubular body 117 with fluid apertures or perforations 113. The fluid apertures 113 can have a diameter of, for example, between 2 millimeters and 8 millimeters (e.g., 5 millimeters). The fluid apertures 113 can be evenly distributed along the circumference of the tool 112 or concentrated in one side of the tool 112, shaped and arranged to maximize the mixing of the injected fluid with the stagnant water. The fluid apertures 113 can be distributed, for example, at a density of 40 holes per square foot.

The wellbore tool 112 can also include one or more sensors 114 (e.g., a water detecting sensor) communicatively coupled to a processing device 121. The sensor 114 can detect the water "W" in the wellbore 104 to help determine where to position the wellbore tool 112 during the water removal process. For example, the wellbore tool 112 can be positioned inside the water "W"

The processing device 121 can include or be coupled to a controller 123 configured to control components of the wellbore assembly 100 such as the pump 109 and the sensor 114. In some implementations, the processing device 121 can be a controller. The processing device 121 can be at the surface 107 of the wellbore 104 or disposed within the wellbore 104. For example, the processing device 121 (and the controller 123) can be attached to the wellbore tool 112. In some implementations, the processing device 121 can be implemented as a distributed computer system disposed partly at the surface and partly within the wellbore. The computer system can include one or more processors and a computer-readable medium storing instructions executable by the one or more processors to perform the operations described here. In some implementations, the processing device 121 can be implemented as processing circuitry, firmware, software, or combinations of them. The processing device 121 can transmit signals to the pump 109 to control the pump to flow fluids into the wellbore and out of the wellbore. The processing device 121 can also receive information from the water sensor 114 (e.g., when the sensor contacts the water or an interface layer "I" between the water and the hydrocarbons) to determine the location of the water. The processing device 121 or controller can also control the surface equipment to direct the wellbore string 110 and the wellbore tool 112 to log the wellbore to find the water "W."

The pump 109 is fluidly coupled to the wellbore string 110. The pump 109 can flow a fluid "F" such as an emulsifier to and from the downhole location "L." The emulsifier can include any fluid or substance that allows the water "W" and the production fluid "P" (e.g., oil) to mix, becoming an emulsion.

In some implementations, emulsion refers to the mixture or system of two or more liquids that are normally immiscible. The water "W" can get dispersed into the production fluid "P" or the production fluid "P" can be dispersed into the water "W." For example, the emulsifier can allow the formation oil to mix with the all of the water such that the oil is present in the water as small droplets (e.g., macroscopic, microscopic or ultramicroscopic droplets) distributed throughout the water. The emulsifier can be any fluid, material, or substance that, when in contact with the water or the production fluid or both, allows the water to mix with the production fluid to produce an emulsion or foam. The emulsifier can reduce the water density and water hydrocarbon interfacial tension, which causes water to mix with oil and create emulsion or foams.

The emulsifier can include, for example, a surfactant, a gas, a foaming agent (e.g., a water foaming agent), or a combination of the three. The gas can include, for example, methane or carbon dioxide ($CO_2$). For example, the emulsifier can include a gas that, when injected, produces gas bubbles "B" (see FIG. 2) to help mix the water with the production fluid.

The pump 109 can flow the emulsifier "F" through the wellbore string 110 from the terranean surface 107 of the wellbore 104 to the downhole location "L" of the wellbore 104. The wellbore tool can inject the emulsifier "F" into the water "W," emulsifying or mixing the water "W" with the production fluid "P."

Figure 2:
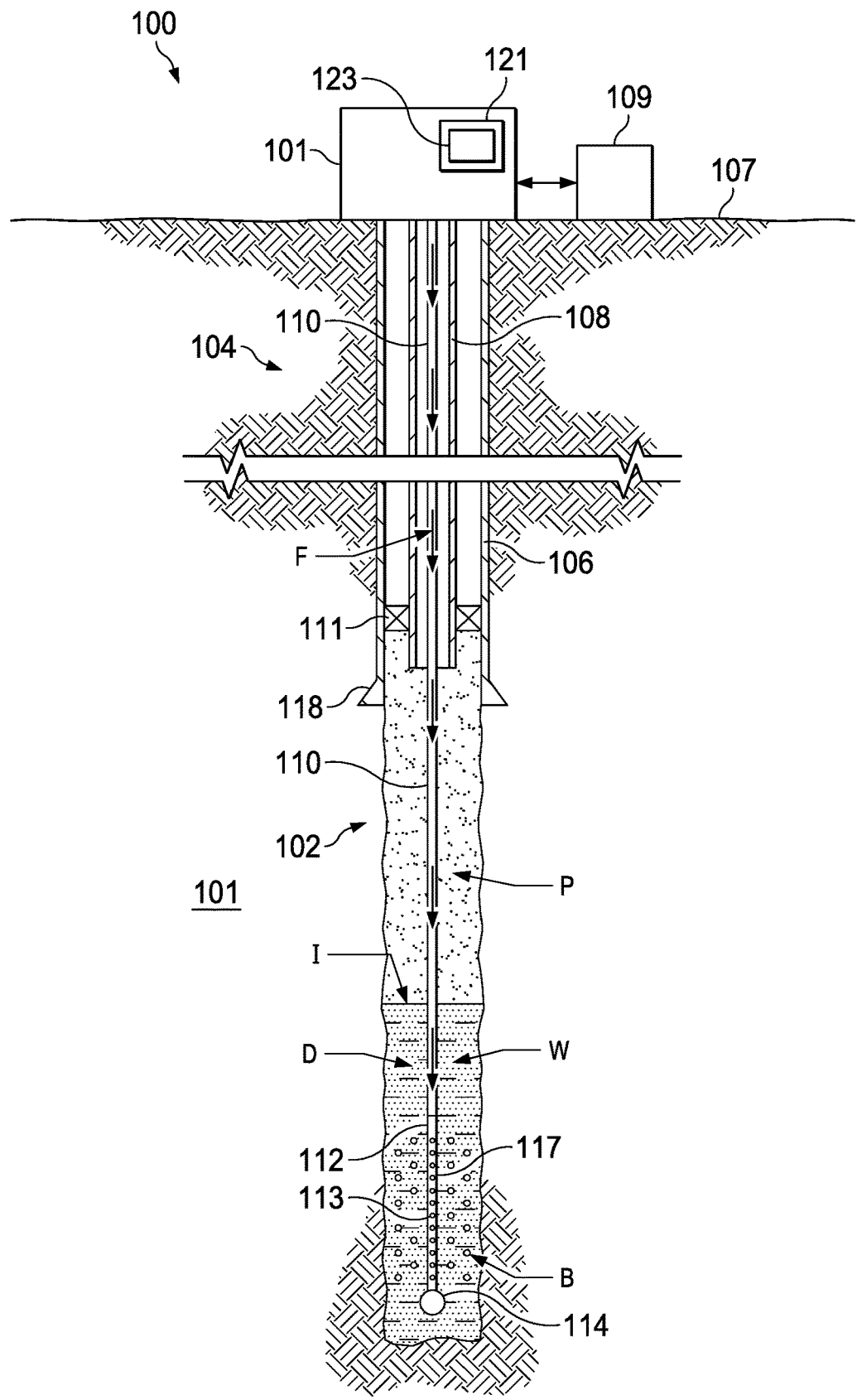
FIG. 2 is a front schematic view, partially cross sectional, of the wellbore assembly in FIG. 1, with an emulsifier injected into the water.

FIG. 2 shows a highly schematic view of the production fluid droplets "D" (e.g., oil droplets) or foam as the production fluid mixes with the water to make an emulsion. Once the water is mixed with the production fluid, the pump 109 can flow the water/oil mixture through the apertures 113 and from the wellbore tool 112 to the wellbore string 110, to the terranean surface 107 of the wellbore 104.

The process of removing the water from the wellbore can be done, for example, automatically (e.g., by the processing device and controller), manually (e.g., by a human operator), or by a combination of the two. The process includes first determining (e.g., by the processing device 123) a production flow rate of a production fluid "P" exiting the wellbore 104. The production flow rate can be determined based on information received by the processing device 123 from a sensor such as a flow meter (not shown) at or near the surface of the wellbore.

The process also includes comparing (e.g., by the processing device 123) the production flow rate to a flow rate threshold. The flow rate threshold can be associated with a target production flow rate. The target production flow rate can be determined based on a real or ideal well productivity of the wellbore. For example, the target production flow rate of the production fluid "P" can be the production flow rate determined to be ideal for the wellbore 104. The target or ideal production flow rate can be determined based on the properties and dynamics of the reservoir and the wellbore, such as oil viscosity, oil permeability, pressure drop, and using a model such as one based on the Darcy equation.

The flow rate threshold can be, for example, some percentage such as 20% to 40% (e.g., 30%) below the target flow rate. In other words, the threshold can be between 60% and 80% (e.g., 70%) of the target flow rate. For example, if the target flow rate is 1000 barrels per day, the threshold can be anywhere from 600 to 800 (e.g., 700) barrels per day. In some implementations, the flow rate threshold can be greater than 80%, such as 95%. If the actual production meets the threshold or falls below the threshold, then the process of determining if water is the problem and removing the water can be initiated. The threshold can be determined based on uncertainties in reservoir and fluid properties and models used to calculate well productivity index.

When water is present in the wellbore, the processor or an operator can determine if the production flow rate satisfies the threshold (e.g., determine if the production flow rate is equal to or less than the flow rate threshold). The process also includes finding the location of the water. For example, the processing device or the controller (or a human operator) can log the wellbore with the sensor 114 until the sensor detects the water. Additionally, the wellbore string 110 or the production string 108 or both can have other sensors or tools to locate the water. For example, the wellbore string 110 can include a production logging tool (PLT) that can be used to locate water sumps.

The process also includes emulsifying, by flowing a sufficient amount of emulsifier "F" along the wellbore string 110 to the water, all of the stagnant water to allow the water to mix with the production fluid. Once the emulsification process is completed, the pump 109 can flow the mixed water and production fluid to the surface of the wellbore 104 to remove all of the water from the wellbore.

The process can also include re-logging, after removing the first sump of water, the wellbore with the water sensor to ensure all or most water in the wellbore has been removed. If more water is detected, the emulsification process can be repeated to remove the additional water. This process can be repeated until the production rate is above the flow rate threshold such that the wellbore is producing hydrocarbons at or near the ideal production rate.

Figure 3:
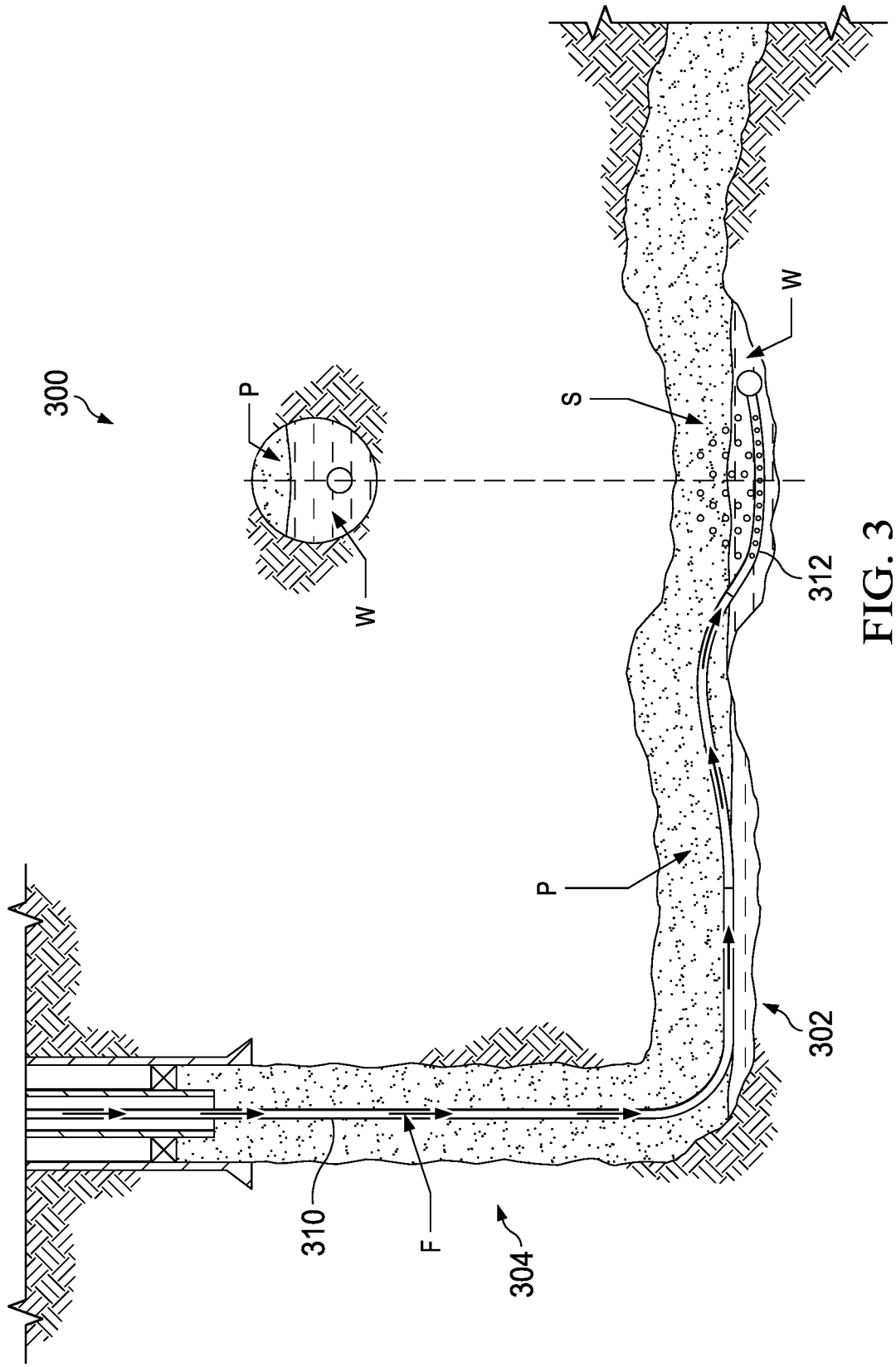
FIG. 3 is a front schematic view, partially cross sectional, of a wellbore assembly disposed in a non-vertical wellbore containing water.

FIG. 3 depicts a wellbore assembly 300 similar to the wellbore assembly 100 in FIG. 1, but implemented in a non-vertical wellbore 304. The wellbore assembly 300 similarly includes a wellbore tool 312 and wellbore tubing 310 (e.g., coiled tubing) that extends through the non-vertical wellbore. The non-vertical wellbore can include water sumps "S" where the deviated section 302 of the non-vertical wellbore 304 curves or has a larger depth. For example, due to the long length of some horizontal wells and their snake-like shape, well deviation can fluctuate around 90 degrees due to drilling, geology, and/or reservoir engineering requirements. In this case, as shown in FIG. 3, water sumps "S" may form in the lower side of the borehole due to gravity. Additionally, water can accumulate at the heel of the non-vertical wellbore. This stagnant water "W" across the wellbore reduces the cross-sectional area of the wellbore for fluid flow of production fluid. Additionally, if the water "W" is repeatedly picked up and dropped down by flowing oil, the water can also create an additional dragging force to the produced hydrocarbons "P" that can cause significant pressure losses relative to total pressure drop across the horizontal well.

Figure 4:
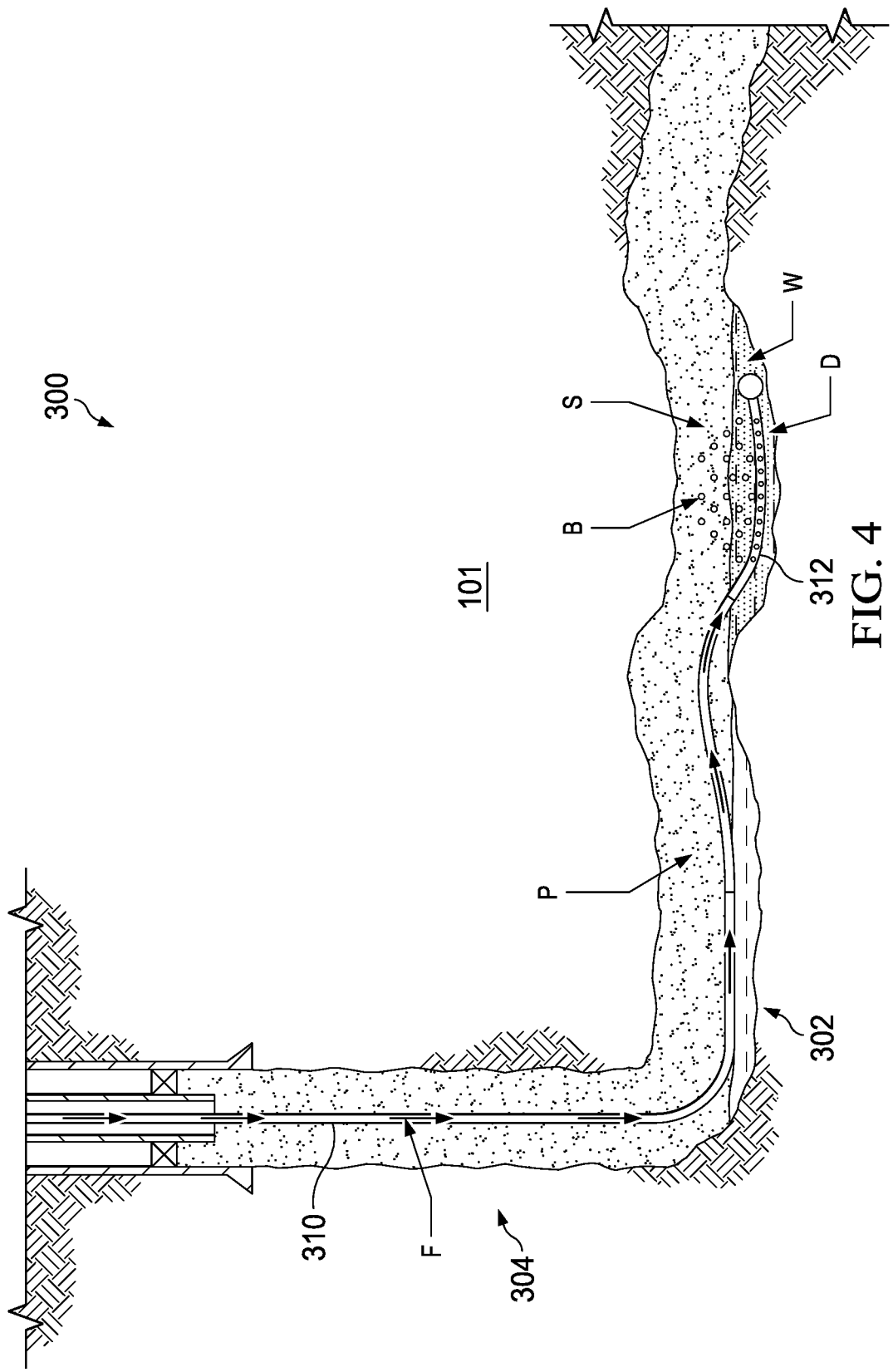
FIG. 4 is a front schematic view, partially cross sectional, of the wellbore assembly in FIG. 3, with an emulsifier injected into the water.

As shown in FIG. 4, similar to the process described with respect to FIGS. 1 and 2, the wellbore assembly 300 can determine that water is interfering with the production fluid "P," then find the water sumps "S" in the wellbore 304, and then remove the water "W" from the wellbore 304. Similar to the wellbore assembly 100 of FIGS. 1 and 2, the wellbore assembly 300 direct its tool 312 (e.g., by curving along the lateral section) to the water sump "S" to inject the emulsifier "F." FIG. 4 shows a highly schematic view of the production fluid droplets "D" (e.g., oil droplets) or foam as the gas bubbles "B" form in the water to mix the fluids. Once the water is mixed with the production fluid, the surface pump (or formation pressure if the well can flow by itself by having high formation pressure) can flow the water/oil mixture through the apertures of the tool 312 to the terranean surface of the wellbore 304.

Figure 5:
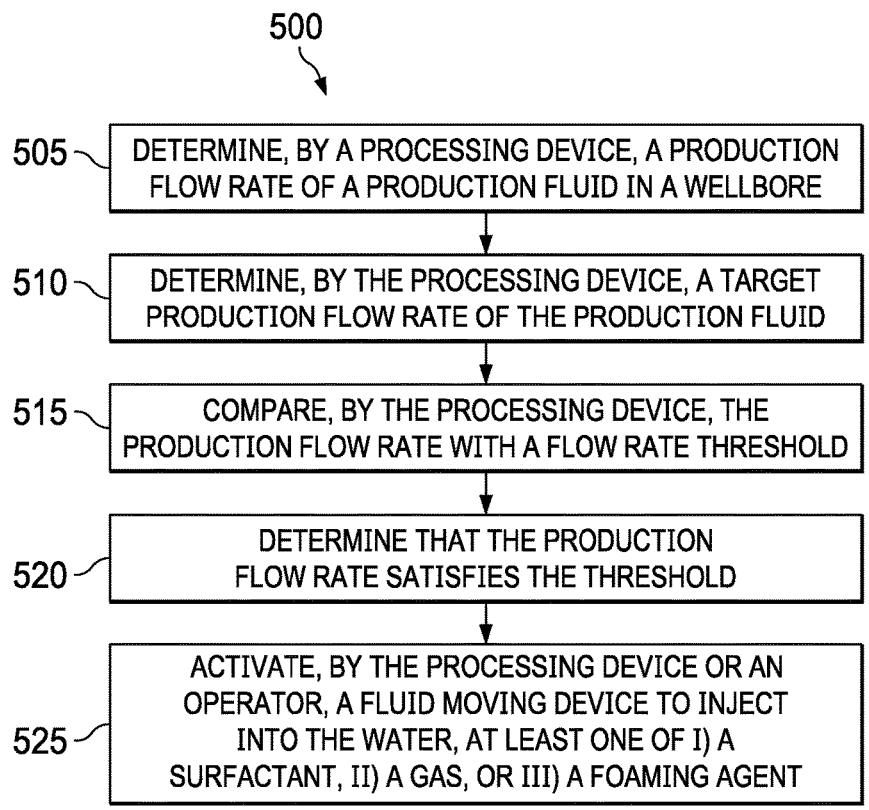
FIG. 5 is a flow chart of a method of automatically removing water from a wellbore.

FIG. 5 shows a flow chart of a method (500) that includes determining, by the processing device, a production flow rate of a production fluid in a wellbore, the wellbore comprising water at a downhole location of the wellbore (505). The method also includes determining, by the processing device, a target production flow rate of the production fluid (510). The method also includes comparing, by the processing device, the production flow rate with a flow rate threshold associated with the target production flow rate (515). The method also includes determining, based on a result of comparing the production flow rate to the flow rate threshold, that the production flow rate satisfies the threshold (520). The method also includes actuating or activating, by the processing device or an operator, a fluid moving device fluidly coupled to a wellbore string extending from a terranean surface to the water to inject, through the wellbore string and into the water, at least one of i) a surfactant, ii) a gas, or iii) a foaming agent, allowing the water and the production fluid to emulsify together and thereby allowing a mixture of water and production fluid to flow from the downhole location to the terranean surface of the wellbore (525).

Figure 6:
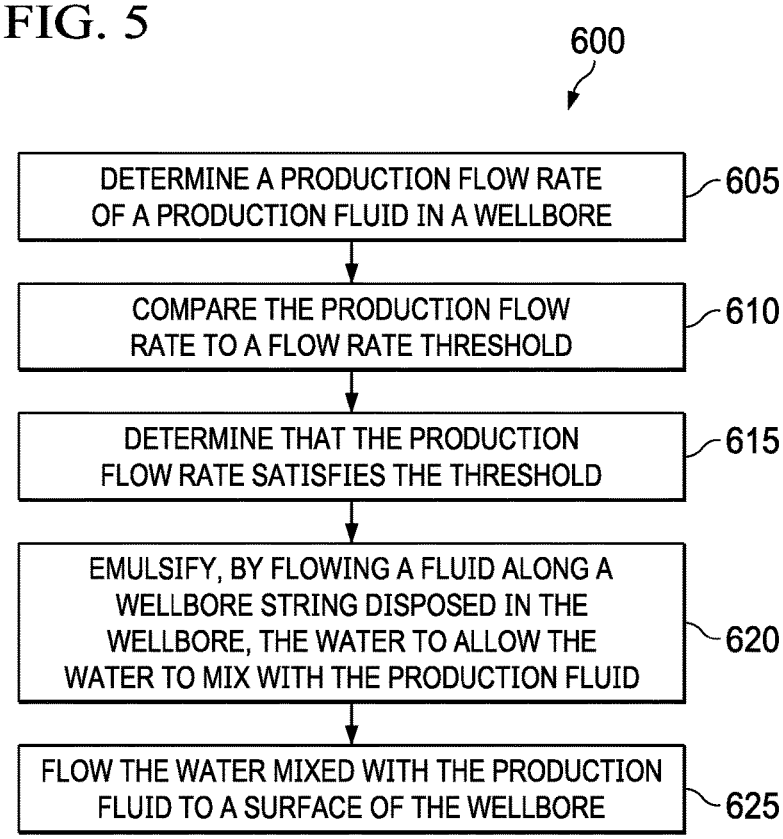
FIG. 6 is a flow chart of a method of removing water from a wellbore.

FIG. 6 shows a flow chart of a method (600) of removing water from a wellbore. The method includes determining a production flow rate of a production fluid in a wellbore, the wellbore comprising water at a downhole location of the wellbore (605). The method also includes comparing the production flow rate to a flow rate threshold (610). The method also includes determining, based on a result of comparing the production flow rate to the flow rate threshold, that the production flow rate satisfies the threshold (615). The method also includes emulsifying, by flowing a fluid along a wellbore string disposed in the wellbore, the water to allow the water to mix with the production fluid (620). The method also includes flowing, through the wellbore string or a second wellbore string, the water mixed with the production fluid to a surface of the wellbore (625).

Figure 7:
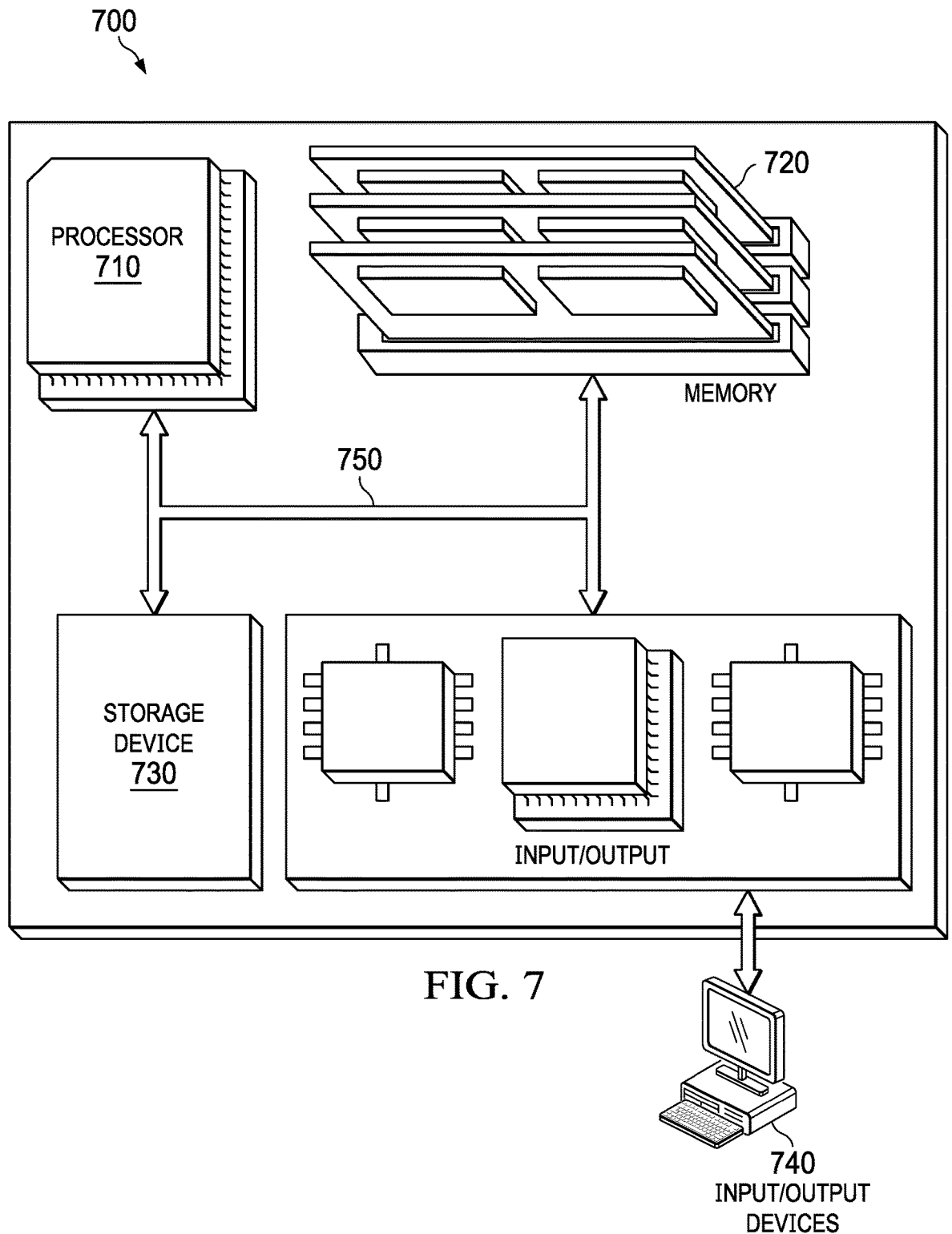
FIG. 7 is a schematic illustration of an example control system for a wellbore assembly according to implementations of the present disclosure.

FIG. 7 is a schematic illustration of an example control system or processing device or control system according to the present disclosure. For example, the controller 700 may include or be part of the controller 123 shown in FIGS. 1-2 (and included but not shown in FIGS. 3-4), or may include or be part of the controller 123 and processing device 121 shown in the same figures. The controller 700 is intended to include various forms of digital computers, such as printed circuit boards (PCB), processors, digital circuitry, or otherwise. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output device 740. Each of the components 710, 720, 730, and 740 are interconnected using a system bus 750. The processor 710 is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the controller 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the controller 700. In one implementation, the storage device 730 is a computer-readable medium. In various different implementations, the storage device 730 may be a floppy disk device, a hard disk device, an optical disk device, or a tape device.

The input/output device 740 provides input/output operations for the controller 1000. In one implementation, the input/output device 740 includes a keyboard and/or pointing device. In another implementation, the input/output device 740 includes a display unit for displaying graphical user interfaces.

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method, comprising:
   determining, by a processing device and based on feedback received from one or more sensors, a production flow rate of hydrocarbons in a wellbore, the wellbore comprising stagnant water at a downhole location of the wellbore;
   comparing, by the processing device, the production flow rate with a flow rate threshold associated with a target production flow rate;
   determining, by the processing device and based on a result of comparing the production flow rate to the flow rate threshold, that the production flow rate satisfies the threshold;
   logging, with a wellbore string comprising one or more water sensors, the wellbore as the wellbore string moves along the wellbore to detect stagnant water with the one or more water sensors;
   receiving, by the processing device and from the one or more water sensors, water sensor feedback;
   determining, as a function of the water sensor feedback, a location of the water within the wellbore; and
   emulsifying the water and hydrocarbons together by transmitting, by the processing device to a controller coupled to a fluid moving device fluidly coupled to the wellbore string, instructions to activate the fluid moving device, the wellbore string extending from a terranean surface of the wellbore to a downhole location of the wellbore, and the fluid moving device configured to be activated by the controller as a function of the instructions to inject, through the wellbore string, an emulsifier at the location of the water to emulsify the water and the hydrocarbons, causing the water and the hydrocarbons to emulsify together and form an emulsion of water and hydrocarbons that are flowed from the downhole location to the terranean surface of the wellbore.

2. The method of claim 1, wherein the flow rate threshold comprises between 60 and 80 percent of the target production flow rate, and determining that the production flow rate satisfies the threshold comprises determining that the production flow rate is equal to or less than the flow rate threshold.

3. The method of claim 1, wherein the wellbore string is fluidly coupled to a perforated wellbore tool residing at a downhole end of the wellbore string, and the transmitting of the instructions comprises causing the fluid moving device to inject the emulsifier through apertures of the perforated wellbore tool into the water, the emulsifier comprising at least one of i) a surfactant, ii) a gas, or iii) a foaming agent.

4. The method of claim 3, wherein flowing the emulsified water and hydrocarbons to the surface comprises flowing, through the apertures of the perforated wellbore tool into the wellbore tool, and from the perforated wellbore tool to the surface of the wellbore.

5. A method, comprising:
   determining a production flow rate of hydrocarbons in a wellbore, the wellbore comprising stagnant water at a downhole location of the wellbore;
   determining that the production flow rate satisfies a flow rate threshold,
   logging, with a wellbore string comprising one or more water sensors, the wellbore as the wellbore string moves along the wellbore to detect stagnant water with the one or more water sensors;
   determining, based on feedback from the one or more water sensors, a location of the water within the wellbore;
   flowing, as a function of determining that the production flow rate satisfies the flow rate threshold, a fluid unto the water, emulsifying the water with the hydrocarbons; and
   flowing, through the wellbore string, the water emulsified with the hydrocarbons to a surface of the wellbore.

6. The method of claim 5, wherein emulsifying the water comprises introducing, through the wellbore string and based on the determination that the production flow rate satisfies the threshold, an emulsifier comprising at least one of i) a surfactant, ii) a gas, or iii) a foaming agent to the water.

7. The method of claim 5, wherein the flow rate threshold is associated with a target production flow rate, the target production flow rate based on a real or ideal well productivity of the wellbore.

8. The method of claim 7, wherein the flow rate threshold comprises between 60 and 80 percent of the target production flow rate, and determining that the production flow rate satisfies the flow rate threshold comprises determining that the production flow rate is equal to or less than the flow rate threshold.

9. The method of claim 5, further comprising determining, before comparing the production flow rate to the flow rate threshold, a target production flow rate, the target production flow rate based on a real or ideal well productivity of the wellbore.

10. The method of claim 5, further comprising, after determining the target production flow rate, determining, based on the target production flow rate, the flow rate threshold.

11. The method of claim 5, wherein the wellbore string is fluidly coupled to a perforated wellbore tool residing at a downhole end of the wellbore string, and emulsifying the water comprises injecting an emulsifier flowing through apertures of the perforated wellbore tool into the water.

12. The method of claim 11, wherein flowing the water mixed with the hydrocarbons to the surface comprises flowing, through the apertures of the perforated wellbore tool into the wellbore tool, and from the perforated wellbore tool to the surface of the wellbore.

13. The method of claim 5, wherein the logging, comprises logging, after the flowing, the wellbore with the water sensors to detect any remaining water in the wellbore.

14. The method of claim 5, wherein introducing the emulsifier comprises introducing a water foaming agent and a gas comprising at least one of methane or carbon dioxide.

15. A wellbore assembly comprising:
- a movable wellbore string configured to be disposed within and move along a wellbore and extend from a terranean surface of the wellbore to a downhole location of the wellbore, the wellbore string comprising one or more water sensors attached to a downhole portion of the wellbore string and arranged to detect, as the wellbore string moves along the wellbore, stagnant water within the wellbore, the stagnant water immiscible with hydrocarbons disposed in the wellbore;
- a pump configured to be fluidly coupled to the wellbore string, the pump configured to flow an emulsifier comprising at least one of i) a surfactant, ii) a gas, or iii) a foaming agent through the wellbore string from the terranean surface of the wellbore to the downhole location of the wellbore; and
- a wellbore tool attached and fluidly coupled to a downhole end of the wellbore string, the wellbore tool comprising a tubular body comprising apertures and configured to be immersed in water detected by the sensors to flow, from the wellbore string, the emulsifier, the wellbore tool configured to inject the emulsifier at the downhole location of the wellbore and into the water, emulsifying the water with the hydrocarbons, and wherein the pump is configured to flow, from the wellbore tool to the wellbore string and to the terranean surface of the wellbore, the water emulsified with the hydrocarbons.

16. The wellbore assembly of claim 15, wherein the wellbore tool comprises a tubular body defining a plurality of apertures, the tubular body configured to inject, through the apertures, the emulsifier flowing into the water.

* * * * *